(12) United States Patent
Kijima

(10) Patent No.: US 7,702,230 B2
(45) Date of Patent: Apr. 20, 2010

(54) DIGITAL CAMERA AND EXPOSURE CONDITION DETERMINING METHOD

(75) Inventor: Takayuki Kijima, Akiruno (JP)

(73) Assignee: Eastman Kodak Company, Rochester, NY (US)

( * ) Notice: Subject to any disclaimer, the term of this patent is extended or adjusted under 35 U.S.C. 154(b) by 637 days.

(21) Appl. No.: 11/465,130

(22) Filed: Aug. 17, 2006

(65) Prior Publication Data

US 2007/0116450 A1  May 24, 2007

(30) Foreign Application Priority Data

Nov. 21, 2005 (JP) ............................. 2005-335937

(51) Int. Cl.
 G02B 7/28 (2006.01)
 G03B 7/099 (2006.01)
 G03B 3/00 (2006.01)
 G03B 13/00 (2006.01)
 H04N 5/232 (2006.01)

(52) U.S. Cl. .................... 396/114; 396/128; 396/79; 348/350; 348/363

(58) Field of Classification Search ................ 396/111, 396/79, 89, 114, 128, 355, 447; 348/349, 348/353, 354, 343, 344, 345, 350, 363
See application file for complete search history.

(56) References Cited

U.S. PATENT DOCUMENTS 5,650,607 A * 7/1997 Kusaka ................. 250/201.8
5,734,930 A * 3/1998 Hagiwara ................ 396/50
7,006,140 B2   2/2006 Shono

FOREIGN PATENT DOCUMENTS

JP  2002-006208  1/2002
JP  2002-271673  9/2002

* cited by examiner

Primary Examiner—Rochelle-Ann J Blackman
(74) Attorney, Agent, or Firm—Pamela R. Crocker; Peyton C. Watkins

(57) ABSTRACT

To provide a digital camera capable of causing a focus sensor to detect a focus while outputting to an image sensor image data for providing appropriate exposure after having adjusted an aperture ratio of an aperture in an image capture optical system such that appropriate exposure is achieved. A digital camera divides light from a subject having passed through an aperture into two beams of light; causes one of the beams to enter the image sensor to thus cause the image sensor to capture a subject image; and causes the other beam to enter the focus sensor to thus cause the focus sensor to detect a focus from the other beam of light. The digital camera adjusts an aperture ratio of the aperture such that the quantity of the other beam reaches the minimum quantity of light at or above which the focus sensor can detect a focus.

11 Claims, 11 Drawing Sheets

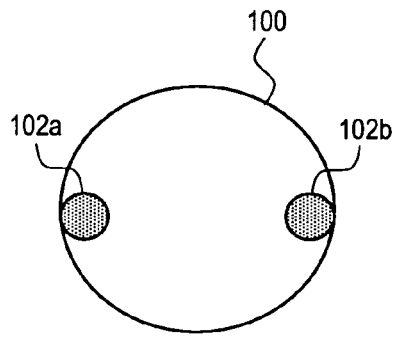 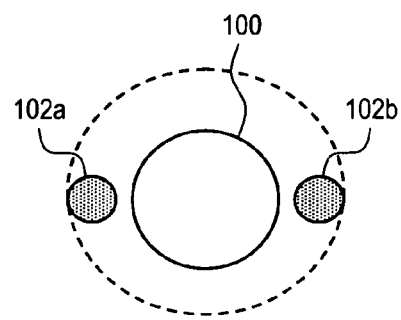
FIG. 6A  FIG. 6B
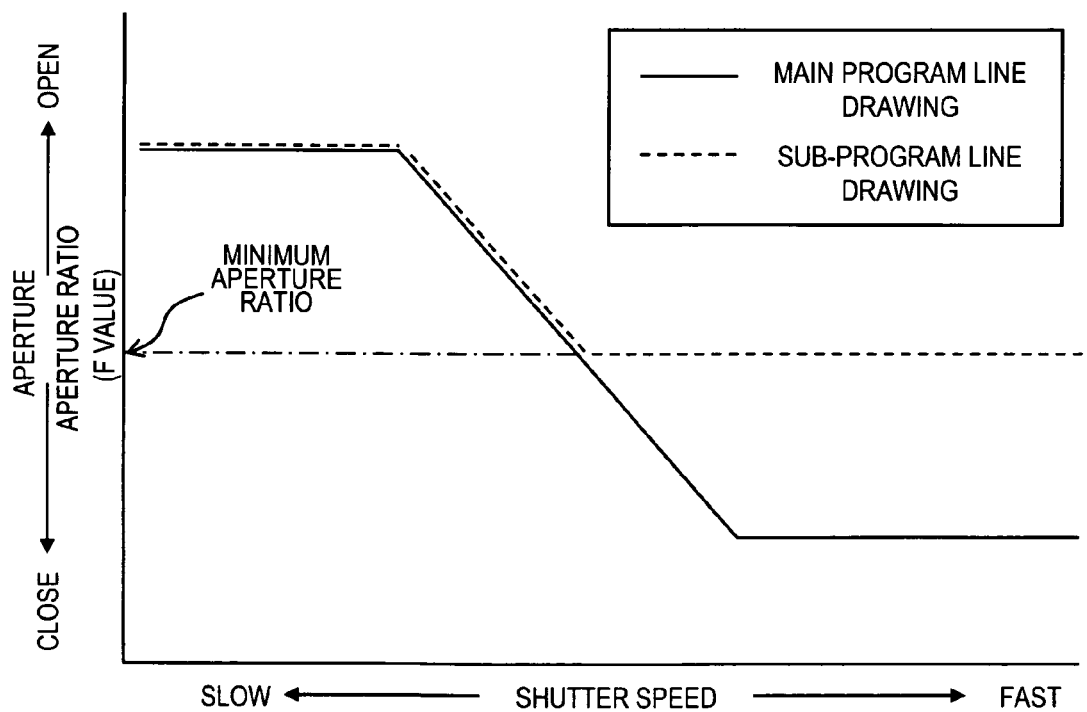
FIG. 7

DIGITAL CAMERA AND EXPOSURE CONDITION DETERMINING METHOD

CROSS REFERENCE TO RELATED APPLICATIONS

This application claims priority to Japanese Patent Application No. 2005-335937 filed on Nov. 21, 2005, which is incorporated herein by reference in its entirety.

FIELD OF THE INVENTION

The present invention relates to a focus sensor for detecting a focus on the basis of light originating from a subject, as well as to a digital camera having an image sensor for capturing an image of a subject on the basis of light originating from the subject.

RELATED ART

Japanese Patent Laid-Open Publication No. 2002-6208 describes a related art technique in this field. The digital camera described in this publication has a half mirror used for dividing light, which has originated from the subject and passed through an image capture optical system, into two beams of light and causing one of the beams of light to enter an image pickup element and the other one of the beams of light to enter an AF (Auto Focus) unit of phase difference type. By means of such a configuration, the digital camera outputs to the image pickup element image data to be displayed in an electronic viewfinder and, meanwhile, causes a focus sensor (an AF unit) to detect a focus. Subsequently, after having adjusted the aperture ratio of the aperture belonging to the image pickup optical system in such a way that appropriate exposure is attained, the digital camera causes the half mirror to recede from the optical axis and also causes the image pickup element to output still image data.

However, in the patent publication, consideration is not given to the digital camera causing the image pickup element to output image data and, meanwhile, causing the focus sensor to detect a focus after having adjusted the aperture ratio of the aperture belonging to the image pickup optical system in such a way that appropriate exposure is attained.

SUMMARY OF THE INVENTION

Accordingly, the present invention provides a digital camera capable of causing a focus sensor to detect a focus and, meanwhile, causing an image sensor to output image data of appropriate exposure even after having adjusted a aperture ratio of the aperture belonging to an image pickup optical system in such a way that appropriate exposure is attained.

The present invention provides a digital camera which divides light having come from a subject and having passed through an aperture, into two beams of light; which causes one of the divided beams of light to enter an image sensor to thereby cause the image sensor to capture an image of a subject; and which causes the other one of the beams of light to enter a focus sensor to thereby cause the focus sensor to detect a focus on the basis of the other beam of light, the camera comprising:

an exposure condition determining section for determining exposure conditions, including an aperture ratio of the aperture, under which the image sensor can capture an image at appropriate exposure, in accordance with the quantity of light from the subject, wherein, when the focus sensor cannot detect a focus on the basis of the other one of the beams of light divided after having passed through the aperture, at the aperture ratio determined by the exposure condition determining section, the exposure condition determining section fixes the aperture ratio of the aperture at a minimum aperture ratio at or above which the focus sensor can detect a focus, thereby determining the exposure conditions.

In one mode of the digital camera of the present invention, the digital camera further comprises a focus control section for causing the focus sensor to detect a focus while maintaining the aperture at the minimum aperture ratio during the course of the image sensor consecutively outputting image data on the basis of the light from the subject.

The focus control section causes, for instance, the focus sensor to detect a focus every time the image sensor outputs a predetermined number of frames of image data.

Moreover, the focus control section causes the focus sensor to detect a focus every time the image sensor outputs one frame of image data. In this case, a focus processing section performs focus processing in response to a result of focus detection effected by the focus sensor from when the image sensor has completed exposure processing for one frame until the image sensor starts exposure processing for a subsequent one frame.

Further, in another mode of the digital camera of the present invention, the digital camera further comprises a control section for, upon receipt of an image capture stop instruction, maintaining the aperture at the minimum aperture ratio for a predetermined standby period from receipt of the image capture stop instruction.

According to the present invention, even after having adjusted an aperture ratio of an aperture included in an image capture optical system such that appropriate exposure is attained, the digital camera can cause the focus sensor to detect a focus while outputting to the image sensor image data for providing appropriate exposure.

The invention will be more clearly comprehended by reference to the embodiments provided below. However, the scope of the invention is not limited to those embodiments.

BRIEF DESCRIPTION OF THE DRAWINGS

A preferred embodiment of the present invention will be described in detail by reference to the following figures, wherein:

FIG. 6A is a view for describing a light detection target area utilized for a case where a focus sensor detects a focus;

FIG. 6B is a view for describing the light detection target area utilized for a case where a focus sensor detects a focus;

FIG. 7 is a view showing an example line drawing of a main program referred to in the case of a normal image capture mode and another example line drawing of a sub-program referred in the case of a continuous image capture mode;

DETAILED DESCRIPTION OF THE PREFERRED EMBODIMENT

A best mode for implementing the present invention (hereinafter called an "embodiment") will be described by reference to the drawings.

When the user usually depresses a shutter button all the way down upon recognition of the moment in which the user desires to capture an image, a time lag arises from when the user has visually perceived a target until the user actually depresses the shutter button all the way down, and there also arises an additional time lag equal to a period of processing time during which a digital camera captures an image. There may arise a case where, for reasons of the time lag, the user fails to record an image of the moment at which the user has desired to capture an image.

For these reasons, as described in Japanese Patent Laid-Open Publication No. 2002-271673, the following digital camera has hitherto been put forward.

When the shutter button is depressed halfway down, the digital camera prepares for image capture operation such as AE (Automatic Exposure)/AF (Automatic Focusing) processing. After having completed preparation for image capture operation, the camera starts capturing an image of a subject, and consecutively repeats image capture operation until the shutter button is depressed all the way down. A plurality of frames of image data acquired through image capture operation are temporarily retained. The camera records the image data preceding, by a predetermined time lag period, the image data captured when the shutter button has been depressed all the way down, among the temporarily-retained frames of image data, as image data for storage purpose. Thus, the camera can record an image of the instant at which the user has desired to capture.

After the digital camera has completed a preparation for image capture operation such as AE/AF processing, there may arise a risk of blur being induced by positional displacement of the subject or the positional displacement of a camera main body, to thus degrade the quality of consecutively-captured image data.

In light of the above descriptions, the present embodiment provides a digital camera which can prevent a decrease in image quality of captured image data even when the image data are consecutively captured.

Figure 1:
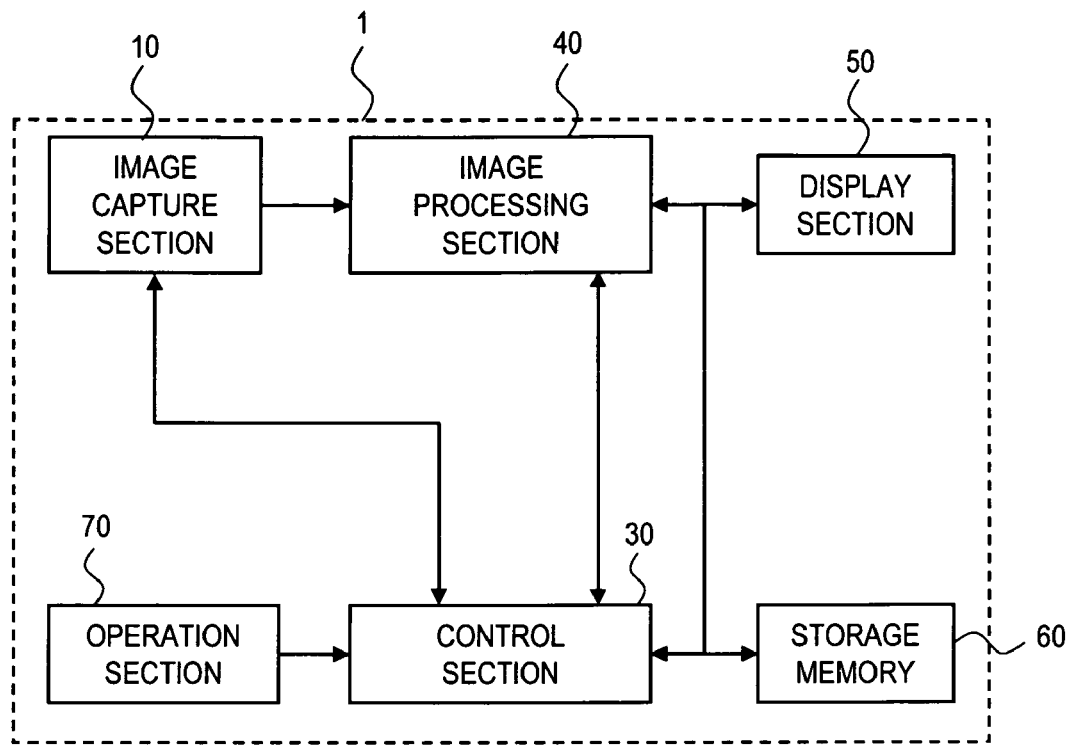
FIG. 1 is a view showing functional blocks of a digital camera according to an embodiment and various modifications thereof.

FIG. 1 is a view showing functional blocks of a digital camera 1 according to the embodiment. An image capture section 10 acquires light originating from a subject and subjects the light to photoelectric conversion, to thus output image data. A control section 30 is a central processor for controlling the entirety of the camera, and performs arithmetic operation and control operation for respective circuits or the like. An image processing section 40 subjects the image data output from the image capture section 10 to predetermined image processing, to thus generate and output image data for display purpose (hereinafter called "display image data") or image data for storage purpose (hereinafter called "storage image data"). The image processing section 40 detects from the image data, for example, the brightness of a subject and the type of the light source used for illuminating the subject. The image data are subjected to white balance adjustment on the basis of the information about the brightness of the subject and the information about the light source, which have been obtained as the detection results. A display section 50 sequentially displays the display image data on a screen, to thus serve as an electronic viewfinder. Memory for storage purpose (hereinafter called "storage memory") 60 records the storage image data. An operation section 70 corresponds to a user interface which includes a shutter button and is used for operating the camera when the user captures a still image or a motion picture by use of the camera.

The camera 1 configured as mentioned above operates in at least two image capture modes; namely, a normal image capture mode and a consecutive image capture mode. When the shutter button has been depressed halfway down, the camera 1 set in the normal image capture mode performs AE/AF processing. When the shutter button has been depressed all the way down, the camera 1 generates image data equivalent to one frame from the light originating from the subject. In the meantime, the camera 1 set in the consecutive image capture mode sequentially generates image data, from the light that originates from the subject, in a consecutive manner at given intervals from when the shutter button has been pressed halfway down until when the shutter button is depressed all the way down.

Figure 2:
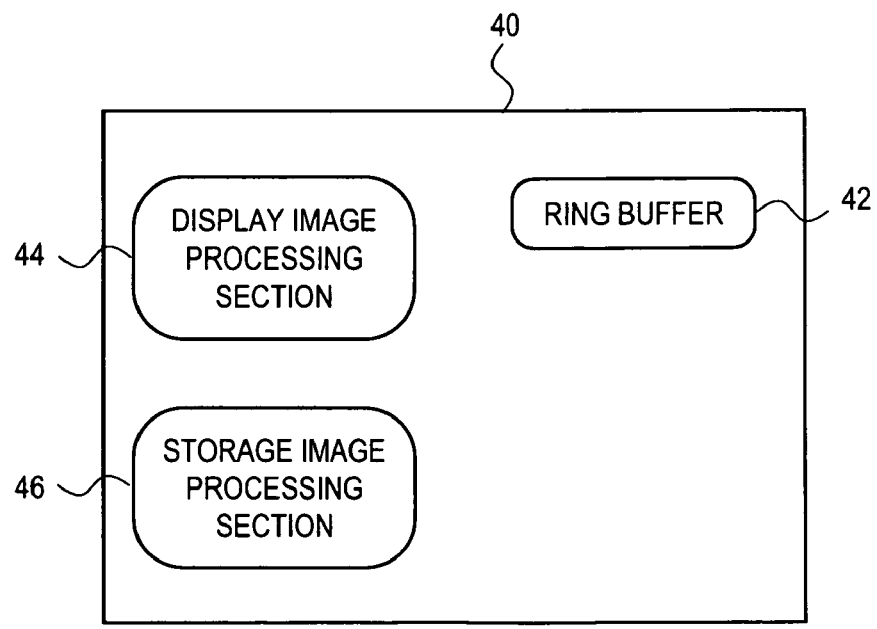
FIG. 2 is a view showing functional blocks of an image processing section according to the embodiment and the modifications thereof.

FIG. 2 is a view showing more-detailed functional blocks of the image processing section 40. In FIG. 2, a ring buffer 42 is temporary retention memory where memory areas formed from a plurality of data buffers are logically arranged in the shape of a ring. In the normal image capture mode, the ring buffer 42 records image data which are output from the image capture section 10 and are equivalent to one frame. In the meantime, in the consecutive image capture mode, the ring buffer 42 stores the image data, which have been consecutively output from the image capture section 10, on a per-frame basis in chronological sequence. When the capacity of the ring buffer 42 for storing image data has become deficient, the ring buffer deletes the image data recorded in the past in order of occurrence and records new image data.

A display image processing section 44 converts the image data output from the image capture section 10 into low-resolution image data, and subjects the low-resolution image data to predetermined image processing for displaying the image on a screen, thereby generating display image data. Further, the display image processing section 44 also subjects the image data stored in the ring buffer 42 to predetermined image processing for displaying an image on the screen, to thus generate display image data. In a normal image capture mode, a storage image processing section 46 subjects one frame of image data stored in the ring buffer 42 to image processing, such as white balance adjustment, to thus generate storage image data. The thus-generated storage image data are recorded in the storage memory 60. In the meantime, in the consecutive image capture mode, the storage image processing section 46 subjects, to image processing, image data—preceding, by a preset time lag period, the image data acquired when the shutter button has been depressed all the way down—among the image data stored in the ring buffer 42, thereby generating storage image data. The thus-generated storage image data are recorded in the storage memory 60.

The image capture section 10 will be further described by reference to the functional block diagrams shown in FIGS. 3A and 3B.

Figure 3A:
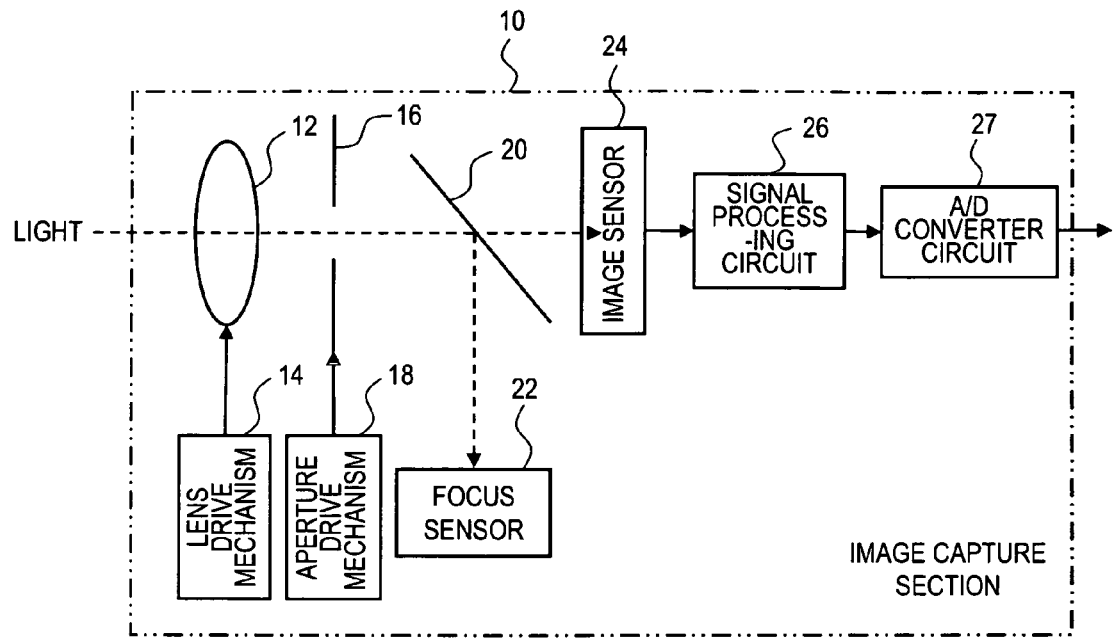
FIG. 3A is a view showing functional blocks of an image capture section in the embodiment and the modifications thereof.
Figure 3B:
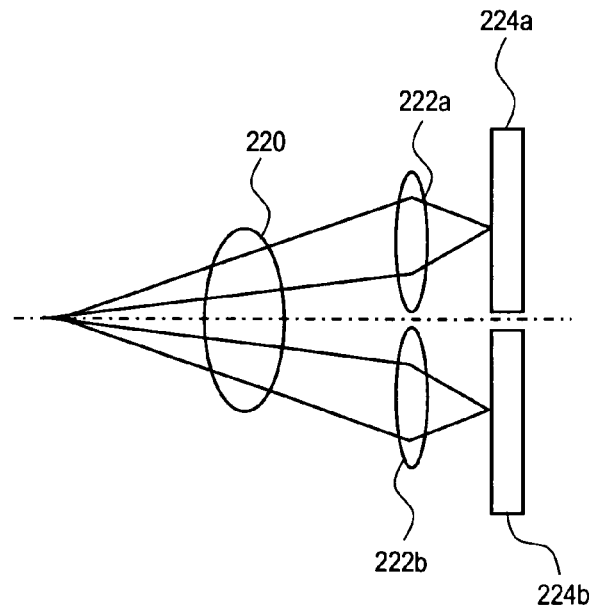
FIG. 3B is a schematic view for describing the configuration of a focus sensor.

In FIG. 3A, an image capture optical system 12 corresponds to a group of lenses comprising a zoom lens and a focus lens. In accordance with a lens control signal from the control section 30, a lens drive mechanism 14 actuates a group of lenses constituting the image capture optical system 12, to thus perform zooming or focusing operation. An aperture 16 adjusts a aperture ratio of the aperture, thereby regulating the quantity of light having originated from the subject and passed through the image capture optical system 12. An aperture drive mechanism 18 adjusts the aperture ratio of the aperture 16 by means of actuating the aperture 16 in accordance with an aperture control signal from the control section 30.

A half mirror 20 reflects a portion of the light having passed through the aperture 16; causes the remaining portion of light to pass through; and divides the remaining light into two beams of light. One of the beams is guided to an image sensor 24, and the other one of the beams is guided to a focus sensor 22. Thereby, the light having passed through the half mirror 20 enters the image sensor 24, and the reflected light enters the focus sensor 22.

A known sensor capable of detecting a focus from the light originating from the subject can be used for the focus sensor 22. For instance, a focus detection mechanism of so-called phase different detection type can be used for the focus sensor 22.

Now, focusing procedures of the focus sensor 22 employed when the focus detection mechanism of phase difference detection type will be briefly described. As shown in FIG. 3B, the focus sensor 22 comprises a capacitor lens 220; a pair of separator lenses 222a, 222b; and a pair of line sensors 224a, 224b disposed at the rear of the focus sensor. The light reflected by the half mirror 20 enters the focus sensor 22. The light having entered the focus sensor 22 is caused to enter the respective line sensors 224 by the pair of separator lenses 222a, 222b via the capacitor lens 220. Thereby, an image of the subject captured by the image capture optical system 12 is formed on the respective line sensors 224. The light having passed through the capacitor lens 220 is limited to light of specific areas from the image capture optical system 12, which differ from each other in terms of exit pupil, by means of the respective separator lenses 222; and enters the respective line sensors 224. By means of such a configuration, the positional relationship (a phase difference) between the images of the subject formed on the respective line sensors 224 varies in accordance with the status of a focus (a front focus, a back focus, and a focus). Consequently, the focus sensor 22 compares the phase difference with a predetermined value, thereby detecting whether or not the image of the subject formed on the image sensor 24 is in focus.

The image sensor 24 is formed from an image pickup element made from a CCD (Charge-Coupled Device) or a CMOS (Complementary Metal Oxide Semiconductor). The image sensor 24 subjects the light, which has passed through the image capture optical system 12, the aperture 16, and the half mirror 20 and come from the subject, to photoelectric conversion; and outputs a resultant image signal. The signal processing circuit 26 subjects the image signal output from the image sensor 24 to predetermined analog signal processing. The signal processing circuit 26 has, e.g., a correlation double sampling circuit (CDS) and an automatic gain control circuit (AGC). The correlation double sampling circuit subjects the image signal to noise reduction processing, and the automatic gain control circuit adjusts a gain used for regulating sensitivity. Thus, the level of the image signal is adjusted. The automatic gain control circuit adjusts a gain on the basis of gain information output from an exposure condition determination section 32 to be described later. An analog-to-digital (A/D) converter circuit 27 converts an analog image signal output from the signal processing circuit 26 into a digital signal.

The control section 30 will now be described by reference to the functional block diagram shown in FIG. 4.

Figure 4:
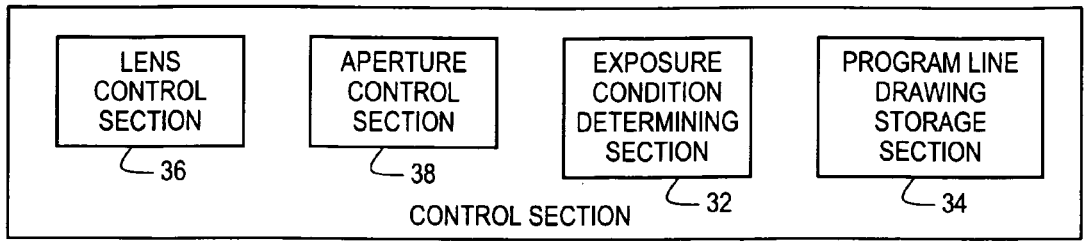
FIG. 4 is a view showing functional blocks of a control section in the embodiment and the modifications thereof.

In FIG. 4, the exposure condition determination section 32 acquires subject brightness information from the image processing section 40, and on the basis of the subject brightness information determines the aperture ratio of the aperture 16 at which appropriate exposure is attained, the shutter speed, and the gain (image capture sensitivity). By reference to a program line drawing retained by a program line drawing storage section 34, the exposure condition determination section 32 determines the aperture ratio, the shutter speed, and the gain in response to the brightness of the subject. The program line drawing storage section 34 retains a standard program line drawing (hereinafter called a "main program line drawing") where limitations are imposed on neither the aperture nor the shutter speed, and a sub-program line drawing where an aperture ratio to be determined is more limited than in the case of the main program line drawing.

In the normal image capture mode, the exposure condition determination section 32 determines exposure conditions [a aperture ratio, a shutter speed, and a gain (image capture sensitivity)] corresponding to the brightness of the subject by reference to the main program line drawing. Meanwhile, the exposure condition determination section 32 determines, in the consecutive image capture mode, exposure conditions corresponding to the brightness of the subject by reference to the sub-program line drawing. The main program line drawing and the sub-program line drawing will be described in detail later.

In accordance with the focus detection result acquired from the focus sensor 22, the lens control section 36 outputs the lens control signal to the lens drive mechanism 14 such that the subject image formed on the image sensor 24 is brought into focus. The aperture control section 38 outputs an aperture control signal to the aperture drive mechanism 18 in such a way that the aperture ratio determined by the exposure condition determination section 32 is achieved.

In the normal image capture mode, the thus-configured camera 1 performs AE/AF processing when the shutter button is depressed halfway down. When the shutter button is depressed all the way down, one frame of image data is written into the ring buffer 42. The camera 1 reads the image data from the ring buffer 42; subjects the thus-read image data to predetermined image processing to thus generate storage image data from the image data; and records the thus-generated storage image data into the storage memory 60.

In the consecutive image capture mode, the camera 1 outputs image data from when the shutter button has been depressed halfway down until the shutter button is depressed all the way down, and sequentially writes the image data into the ring buffer 42. From the groups of image data written in the ring buffer 42, the camera 1 selects one frame of image data having been recorded a preset time lag period before the image data—having been captured when the shutter button has been pressed all the way down—and reads the thus-selected image data as a candidate for storage image data. The thus-read image data are subjected to predetermined image processing to thus generate storage image data from the image data, and the storage image data are recorded into the storage memory 60.

Procedures of image capture processing of the camera 1 employed during setting of the consecutive image capture mode will now be described by reference to the drawings. The image capture mode, such as the normal image capture mode or the consecutive image capture mode, can be set by means of the user selecting a desired image capture mode by operating the camera 1 before starting image capture operation.

First, before procedures of image capture processing performed by the camera 1 are described, procedures of image capture processing performed by a conventional digital camera of this type will be described by reference to the timing chart shown in FIG. 5.

Figure 5:
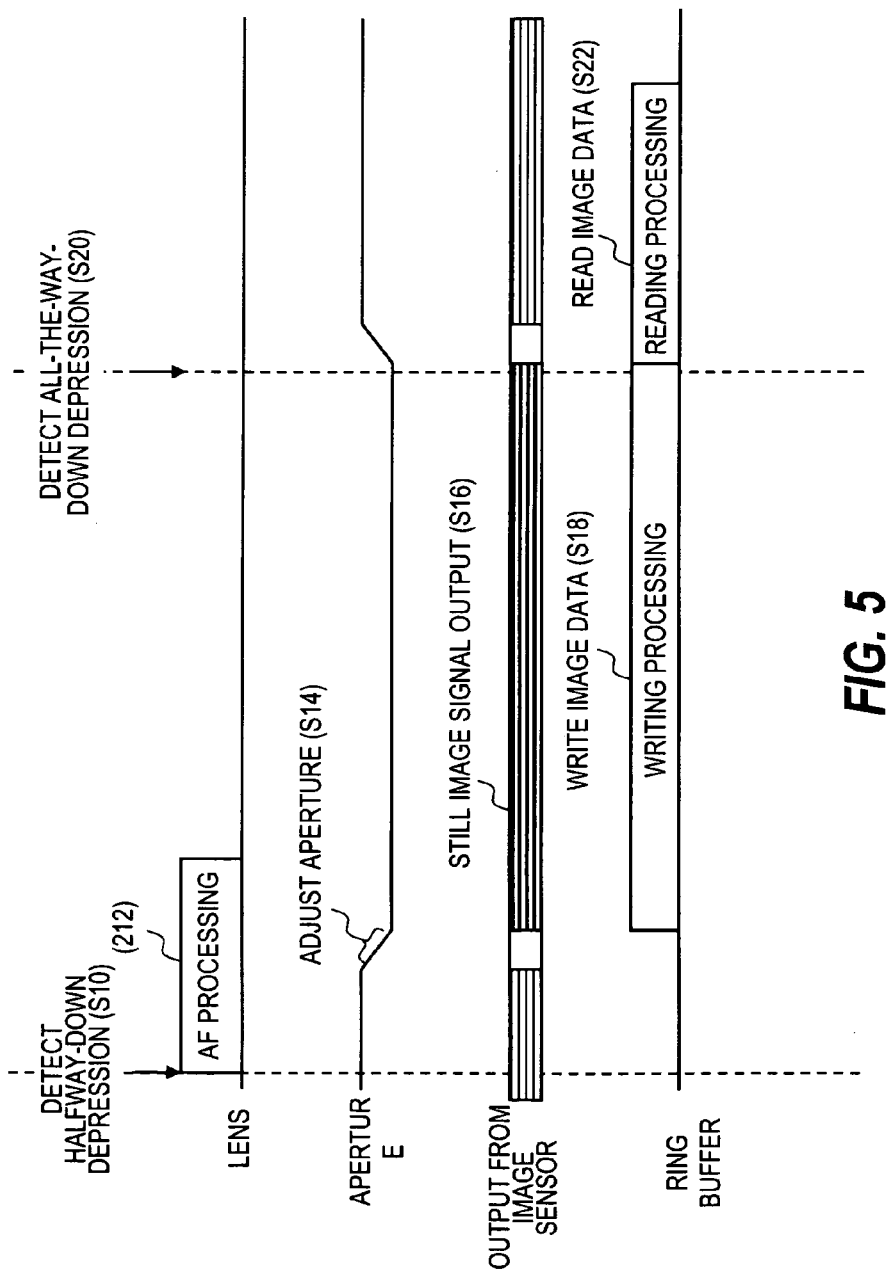
FIG. 5 is a timing chart showing image capture processing of a conventional digital camera.

In FIG. 5, upon detection of halfway-down pressing of the shutter button (S10), the digital camera performs AF processing in accordance with the result of a focus detected by the focus sensor 22 (S12). The digital camera adjusts the aperture so as to achieve the aperture ratio determined by the exposure condition determination section 32 (S14). When adjustment of the aperture is completed, the digital camera consecutively outputs still image data to the image sensor 24 (S16), and the thus-output image data are sequentially written into the ring buffer 42 (S18). Subsequently, upon detection of all-the-way-down depression of the shutter button (S20), the digital camera selects one frame of image data having been recorded a preset time lag period before the image data—having been captured when the shutter button has been pressed all the way down—and reads the thus-selected image data as a candidate for storage image data (S22). Next, the digital camera subjects the thus-read image data to predetermined image processing to thus generate storage image data from the read image data, and records the generated image data into the storage memory 60.

As has been described above, the conventional digital camera does not adjust focusing of the group of lenses from when AF processing has been performed as a result of halfway-down depression of the shutter button until when the shutter button is pressed all the way down. Consequently, for reasons of positional displacement of the subject which arises from when the shutter button has been pressed halfway down until the shutter button is pressed all the way down, the image data consecutively output from the image sensor 24 are brought out of focus, which may in turn degrade image quality.

In light of the problem, a conceivable digital camera causes the focus sensor 22 to detect a focus during a period from when the shutter button has been depressed halfway down until when the shutter button is depressed all the way down, and finely adjusts the group of lenses. However, in relation to the conventional digital camera, no consideration is given to cause the focus sensor 22 to detect a focus simultaneously with output of still image data from the image sensor.

For instance, the images of the subject formed on the line sensors 224 by means of the pair of separator lenses 222*a*, 222*b* of the focus sensor 22 are assumed to be formed by the light having passed through areas designated by reference numerals 102*a*, 102*b* (hereinafter called "detection target areas") within an exit pupil 100 of the image capture lens 12 shown in FIG. 6A. Generally, as a distance between the detection target area 102*a* and the detection target area 102*b* becomes larger, the accuracy of focus detection performed by the focus sensor 22 is improved. Hence, the detection target area 102*a* and the detection target area 102*b* are desirably set as close as possible around the exit pupil of the image capture lens 12. For this reason, the detection target area 102*a* and the detection target area 102*b* are positioned so as become adjacent to the inner radius of the exit pupil achieved when the aperture ratio of the aperture 16 is F5.6. Thus, the positions of the detection target areas 102*a*, 102*b* have been determined in advance. Hence, in a case where the aperture 16 is reduced in accordance with the output from the exposure condition determination section 32 when the brightness of the subject is high, as shown in FIG. 6B, there may arise a case where the detection target areas 102*a*, 102*b* come to positions outside the exit pupil of the image capture lens, to thus block the light of the subject that is to reach the line sensors of the focus sensor 22.

In the present embodiment, the exposure condition determination section 32 determines the aperture ratio of the aperture in the consecutive image capture mode within a limited area where the focus sensor 22 can detect a focus on the basis of incident light. Thus, the aperture ratio of the aperture is limited to the range where the focus sensor 22 can detect a focus. Therefore, in the present embodiment, in addition to the main program line drawing to be referred to in the normal image capture mode, the sub-program line drawing to be referred to in the consecutive image capture mode is stored in the program line drawing storage section 34. The main program line drawing is a line drawing by means of which the aperture ratio of the aperture is not limited to the range where the focus sensor 22 can detect a focus, when the exposure condition determination section 32 makes a reference in order to determine exposure conditions including the aperture ratio of the aperture. A program line drawing analogous to a conventional one can be used. Meanwhile, the sub-program line drawing is one by means of which the aperture ratio of the aperture is limited to the range where the focus sensor 22 can detect a focus, when the exposure condition detection means 32 makes a reference in order to determine exposure conditions including an aperture ratio of the aperture. FIG. 7 shows an example main program line drawing and an example sub-program line drawing. In FIG. 7, the main program line drawing is denoted by a solid line, and the sub-program line drawing is denoted by a broken line.

In the normal image capture mode, the exposure condition determination section 32 determines exposure conditions, including the aperture ratio of the aperture, by reference to the main program line drawing. In the consecutive image capture mode, the exposure condition determination section 32 determines exposure conditions by reference to the sub-program line drawing. At this time, when the aperture ratio of the aperture has reached the minimum aperture ratio at which the focus sensor 22 can detect a focus, the exposure condition determination section 32 fixes the aperture ratio of the aperture 16 to the minimum aperture ratio, thereby determining the other exposure conditions. When the numeral aperture of the aperture 16 is fixed to the minimum aperture ratio, the shutter speed, which is one of the other exposure conditions, is set so as to become faster than the shutter speed determined on the basis of the main program line drawing, thereby preventing occurrence of overexposure. As mentioned above, the minimum aperture ratio is the limitation of aperture ratio which enables appropriate entrance of light to the respective separator lenses constituting the focus sensor 22. The aperture ratio corresponds to a value which is determined by the detection target area 102 determined by specifications of the focus sensor 22.

As above, in the consecutive image capture mode, the exposure condition determination section 32 determines the aperture ratio of the aperture 16 so as not to fall short of the predetermined minimum aperture ratio, whereby the focus sensor 22 can detect a focus without fail even after adjustment of the aperture. Consequently, during the course of the image sensor 24 outputting still image data, the focus sensor 22 can detect a focus.

In the present embodiment, in response to setting of the consecutive image capture mode, the focus sensor 22 detects a focus every time the image sensor 24 outputs a predetermined number of frames of image data from when the shutter button has been depressed halfway down until the shutter button is depressed all the way down. On the basis of the result of detection, the camera 1 re-adjusts the group of lenses in such a way that that image of the subject formed on the image sensor 24 is in focus.

In consideration of the above descriptions, image capture procedures of the camera 1 performed at the time of setting of the consecutive image capture mode will now be described by reference to the drawings.

Figure 8:
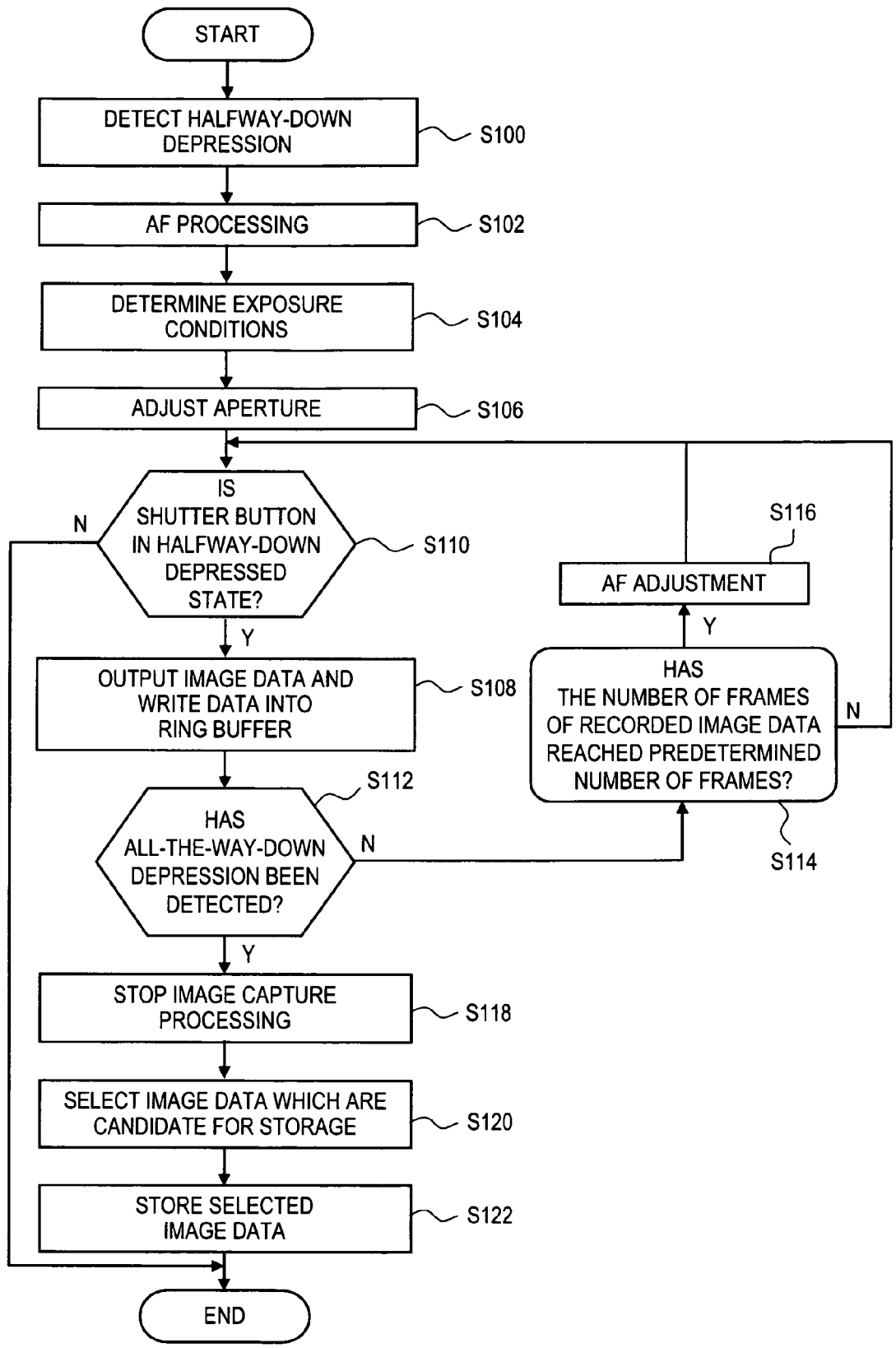
FIG. 8 is a flowchart showing image capture procedures of a digital camera according to the embodiment.

FIG. 8 is a flowchart showing image capture procedures of the camera 1. Upon detection of halfway-down depression of the shutter button (S100), the camera 1 performs AF processing (S102). In short, the focus sensor 22 detects a focus, and the lens control section 36 outputs a lens control signal to the lens drive mechanism 14 on the basis of the result of detection, thereby adjusting the group of lenses in such a way that the image of the subject formed on the image sensor 24 is brought into focus.

The camera 1 determines the exposure conditions such that appropriate exposure is obtained (S104). Specifically, the exposure condition determination section 32 determines the aperture ratio of the aperture, which leads to appropriate exposure, the shutter speed, and the gain in accordance with the information about the brightness of the subject by reference to the sub-program line drawing. Subsequently, in accordance with the determined exposure conditions, the camera 1 adjusts the aperture ratio of the aperture (S106).

Next, so long as the shutter button still remains in the halfway-down depressed state (the result of a determination rendered in S110 is affirmative: Y), the image sensor 24 consecutively outputs the image data at predetermined intervals under the determined exposure conditions. The image data are recorded on a per-frame basis in the ring buffer 42 in chronological sequence (S108).

When the image sensor 24 does not detect all-the-way-down depression of the shutter button during output of image data (the result of determination rendered in S112 is negative: N), the camera 1 determines whether or not the number of frames of image data recorded in the ring buffer 42 has reached a predetermined number of frames (S114). When the result of determination shows that the predetermined number of frames is achieved (the result of a determination rendered in S114 is affirmative: Y), the lens control section 36 acquires the result of detection of a focus performed by the focus sensor 22, and outputs the lens control signal to the lens drive mechanism 14 on the basis of the result of determination, thereby again effecting AF adjustment (S116). In the meantime, when the result of determination shows that the predetermined number of frames has not been attained (the result of a determination rendered in S114 is negative: N), the image sensor 24 continuously outputs image data without effecting AF adjustment. Further, when a predetermined number of frames have been attained, AF adjustment is again performed. As mentioned above, during the course of the image sensor 24 continuously outputting the image data, AF adjustment is performed at predetermined intervals. As a result, even when the shutter button is held in a halfway-down depressed state for a long period of time, less-blurred image data can be sequentially recorded in the ring buffer 42. When the shutter button is released from the halfway-down-depressed state (the result of a determination rendered in S110 is negative: N), the camera 1 causes the image sensor 24 to stop outputting image data and remain in a standby condition until the shutter button is again depressed halfway down.

When the shutter button is depressed all the way down during the course of the image sensor 24 outputting image data (the result of a determination rendered in S112 is affirmative: Y), the camera 1 causes the image sensor 24 to stop outputting image data (S118). Subsequently, the camera 1 selects image data, which will become a candidate for storage, from among the groups of image data recorded in the ring buffer 42 (S120). Specifically, the camera 1 selects, from among the group of pieces of image data written in the ring buffer 42, one frame of image data that precedes, a predetermined time lag period, the image data captured when the shutter button has been depressed all the way down; and reads the thus-selected image data as a candidate for storage image data. The camera 1 subjects the selected image data to predetermined image processing, and records the thus-processed image data into the storage memory 60 (S122).

Figure 9:
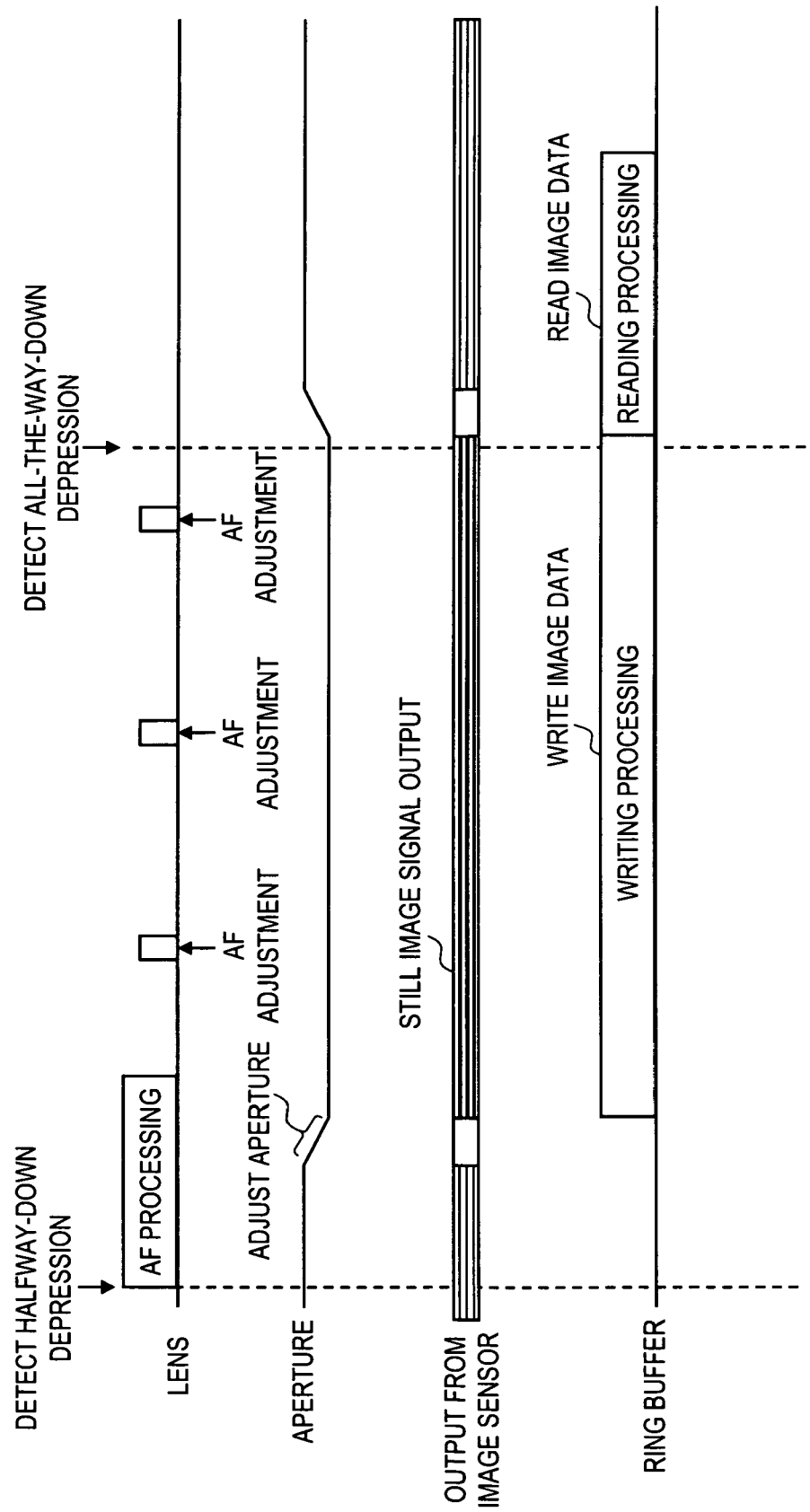
FIG. 9 is a timing chart showing image capture procedures of a digital camera according to the embodiment.

As mentioned above, according to the present embodiment, the image sensor 24 performs AF adjustment as appropriate during the course of consecutive output of image data until the shutter button is depressed all the way down. At this time, the exposure condition determining section 32 determines an aperture ratio of the aperture, which is achieved during image capture operation, so as to exceed the minimum aperture ratio that enables the focus sensor 22 to detect a focus. Therefore, occurrence of a situation where the aperture ratio of the aperture is too small to enable the focus sensor 22 to detect a focus can be prevented. FIG. 9 shows a timing chart of image capture procedures of the camera 1 of the present embodiment achieved in the consecutive image capture mode. As shown in FIG. 9, in the present embodiment, the focus sensor 22 can detect a focus after adjustment of the aperture, and the image sensor 24 can perform AF adjustment as appropriate during the course of output of still image data. Consequently, for instance, even when the shutter button is kept in a halfway-down-depressed state for a long period of time, the camera 1 can sequentially record the less-blurred image data into the ring buffer 42. Consequently, there can be diminished the probability of blurring of the image data which are selected as a candidate for storage from the image data recorded in the ring buffer 42.

A first modification of the present embodiment will now be described.

Figure 10:
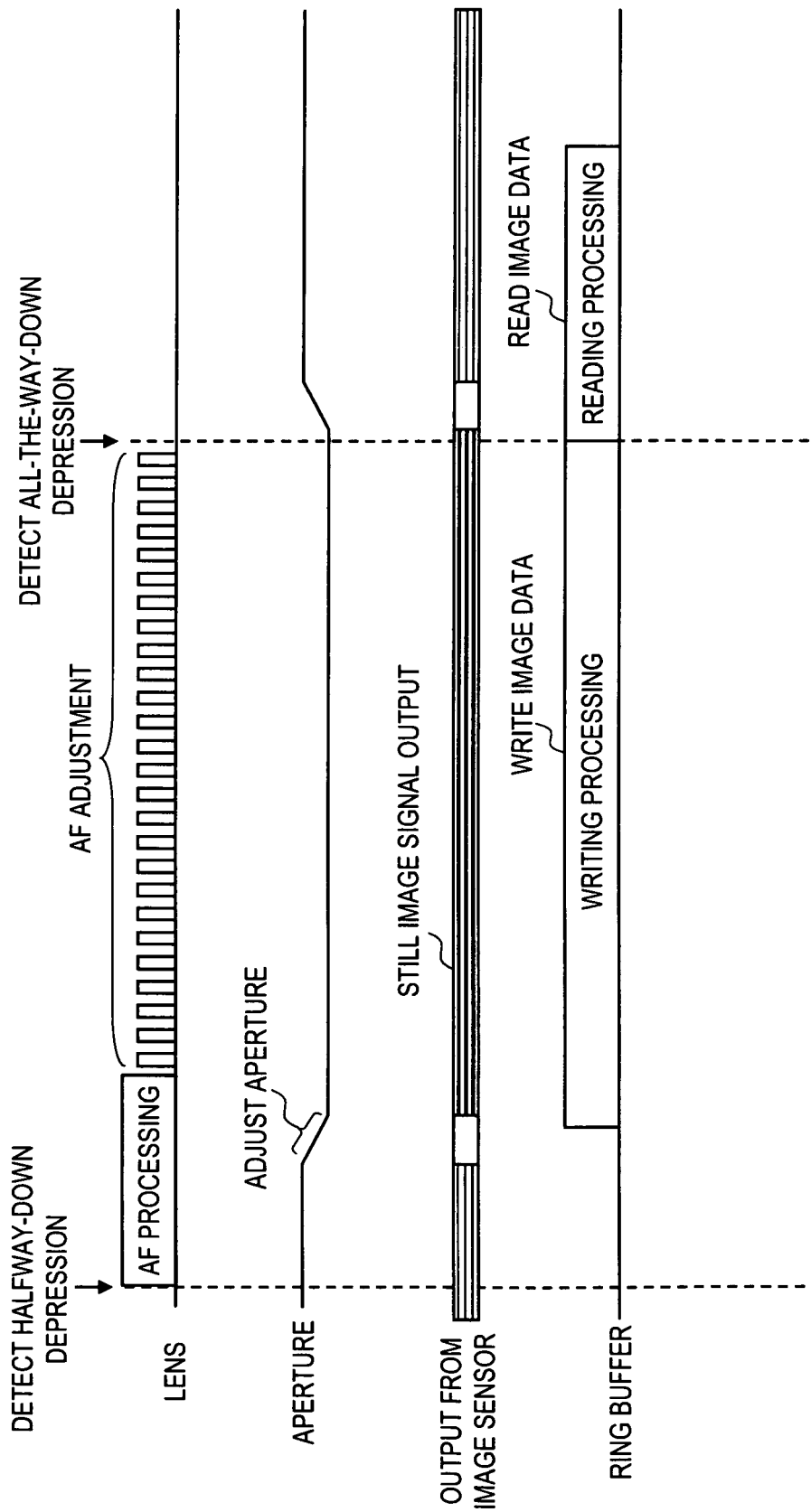
FIG. 10 is a timing chart showing image capture procedures of a digital camera according to a first modification.

FIG. 10 is a timing chart showing image capture procedures of the camera 1 employed in the consecutive image capture mode according to the first modification. As shown in FIG. 10, the camera 1 of the first modification differs from the camera 1 of the embodiment, which effects AF adjustment at intervals of a predetermined number of frames, in that AF adjustment is sequentially performed on a per-frame basis. The camera 1 of the first modification performs AF adjustment from when exposure of one frame of data has been completed until exposure of the next frame is started, thereby sequentially performing AF adjustment on a per-frame basis. In order to realize AF adjustment on a per-frame basis, the camera 1 of the first modification adjusts a shutter speed, to thus adjust a timing at which exposure of the next frame is started, thereby ensuring the time for AF adjustment.

Figure 12:
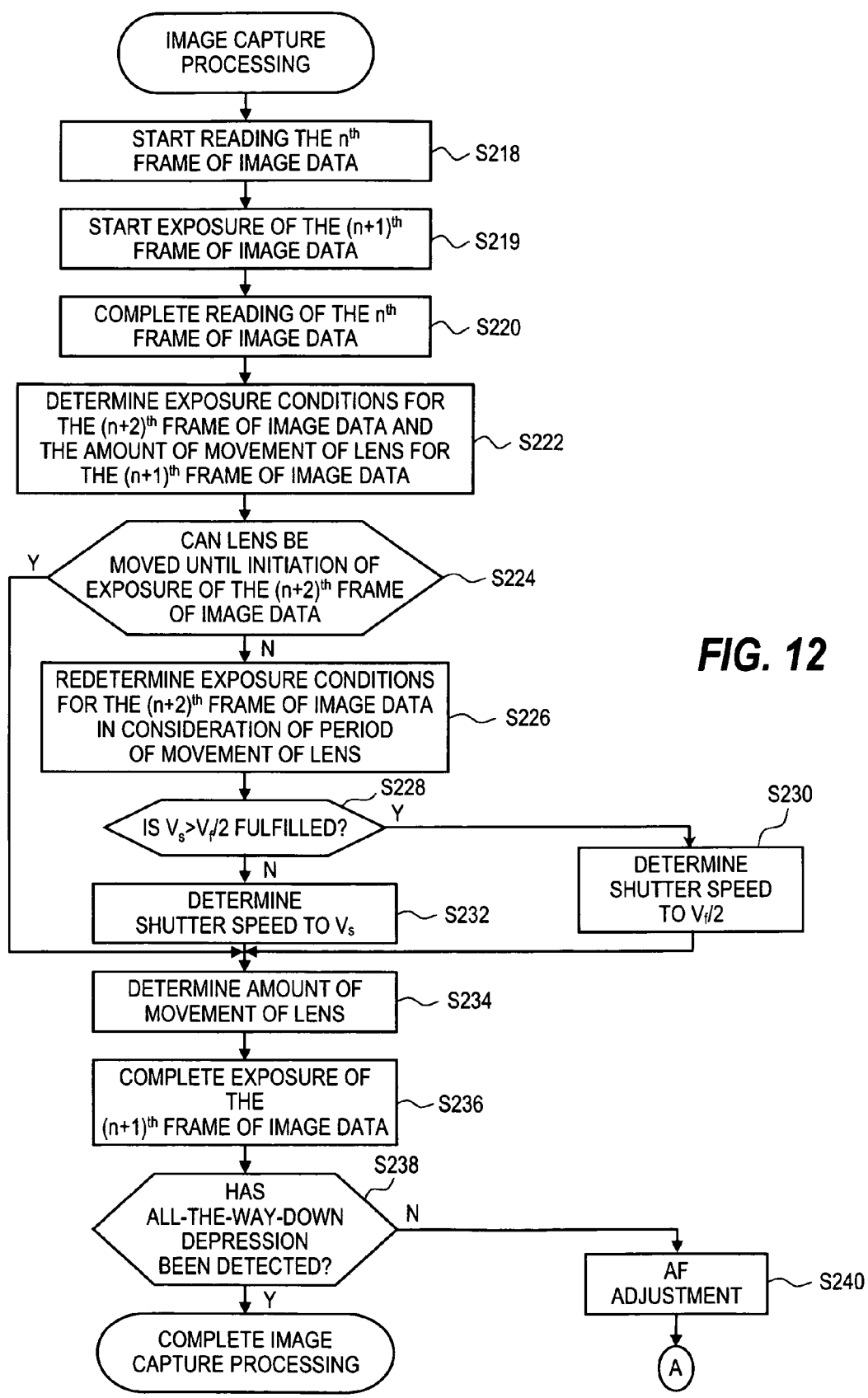
FIG. 12 is a flowchart showing procedures of image capture processing of the digital camera according to the first modification.
Figure 13:
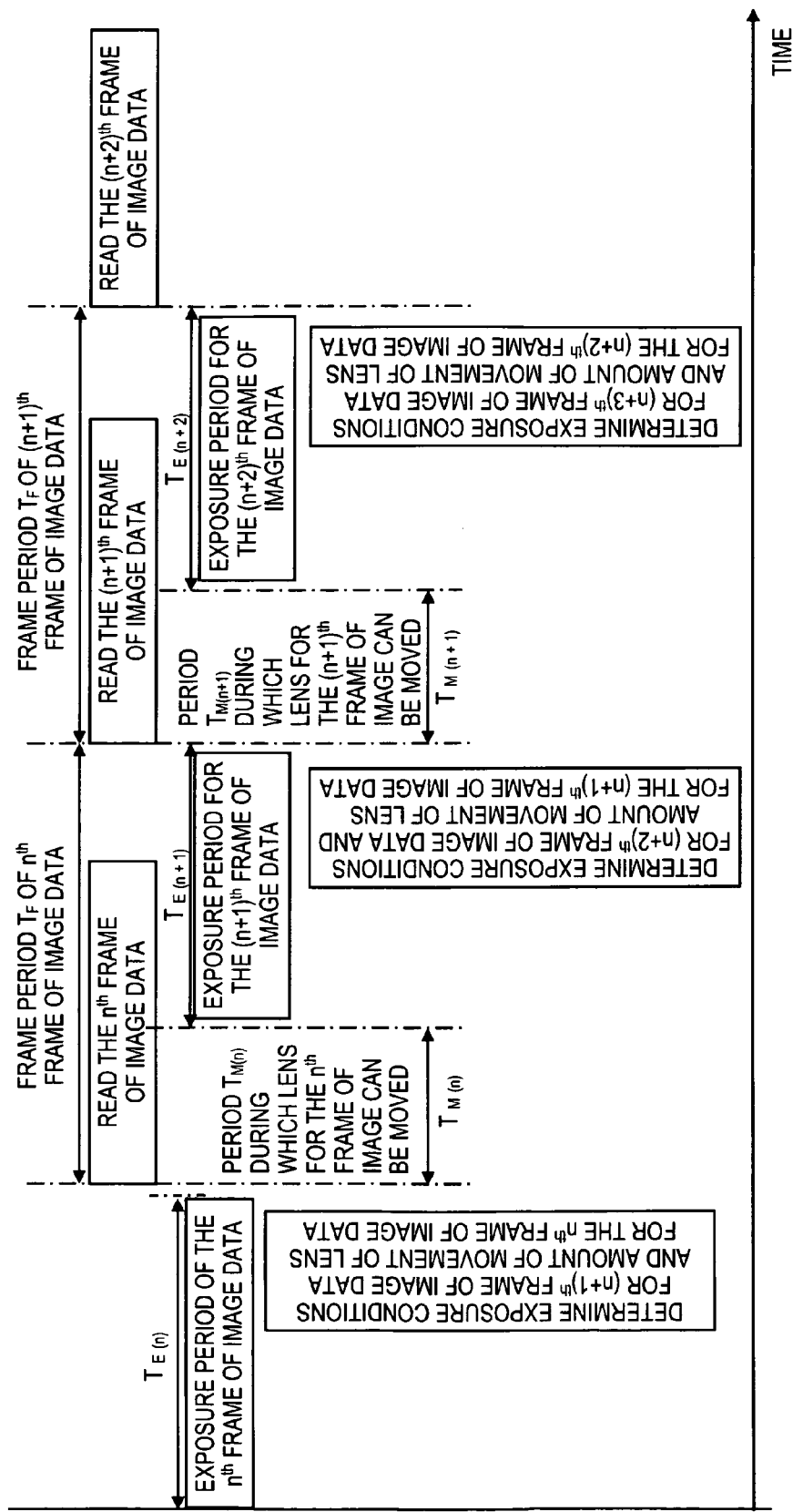
FIG. 13 is a timing chart for describing a period of movement of a lens in the first modification.

The image capture procedures of the camera 1 of the first modification will now be described by reference to FIGS. 11 through 13.

Figure 11:
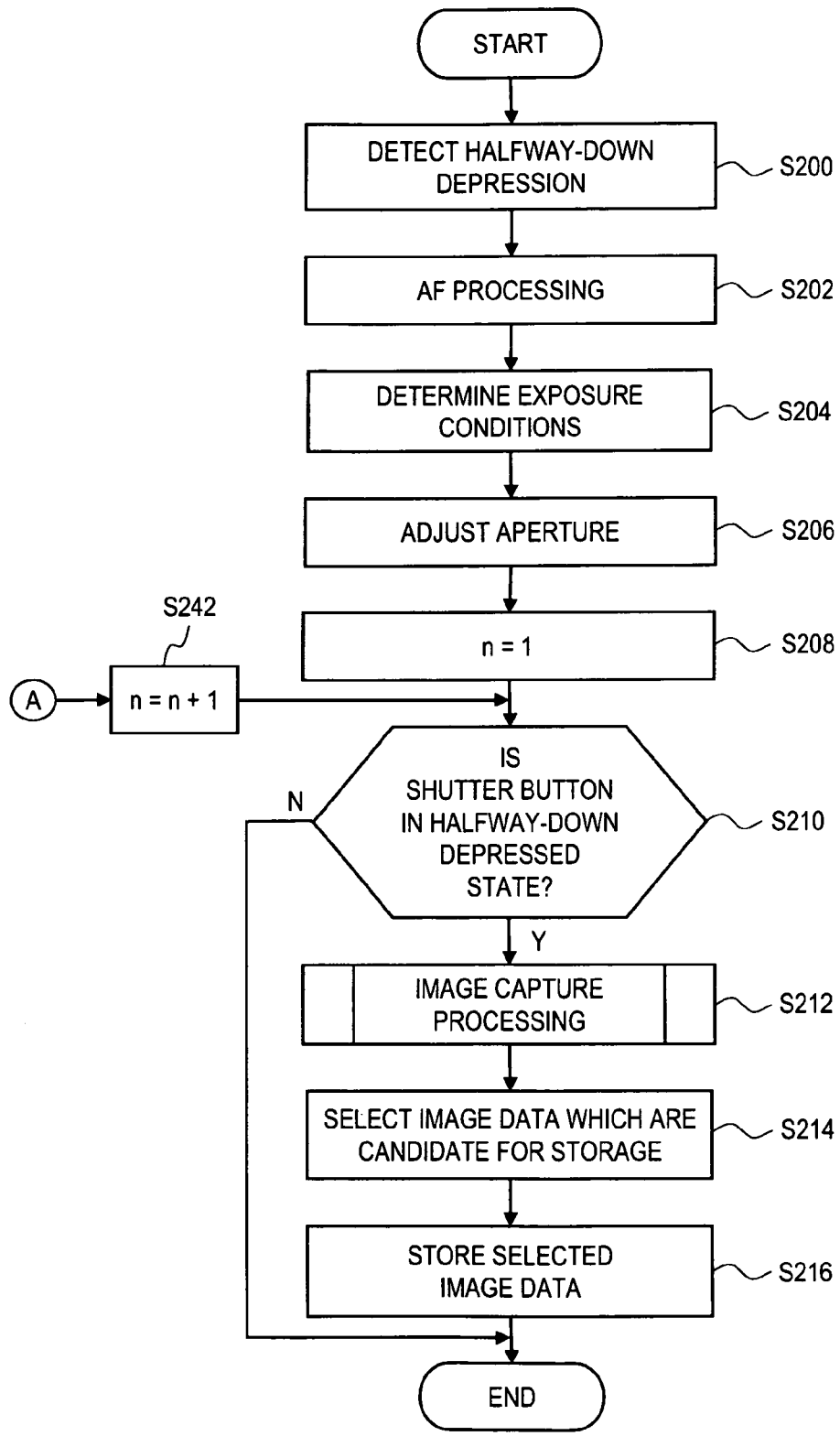
FIG. 11 is a flowchart showing the image capture procedures of the digital camera according to a first modification.

FIG. 11 is a flowchart showing image capture procedures of the camera 1 of the first modification employed in the consecutive image capture mode. As in the case of the embodiment, upon detection of the halfway-down-depression of the shutter button, the camera 1 performs AF processing, determination of the exposure conditions, and adjustment of the aperture (S200 to S206). Next, after completion of adjustment of the aperture 16, the camera 1 inputs an initial value of "1" for a variable "n" to which reference is made during image capture processing (S208). Subsequently, when the halfway-down-depression of the shutter button is continued (the result of the determination rendered in S210 is affirmative: Y), image capture processing is performed (S212). As in the case of the above-described embodiment, when the all-the-way-down depression of the shutter button is detected, the camera 1 selects, from the group of image data written into the ring buffer 42, one frame of image data that precede, a predetermined time lag period, the image data captured when the shutter button has been depressed all the way down; subjects the selected image data to predetermined image processing; and records the thus-processed image data into the storage memory 60 (S214 to S216).

Here, image capture processing pertaining to step (S212) will be described by reference to the flowchart shown in FIG. 12 and the timing chart shown in FIG. 13.

First, the image sensor 24 starts reading the $n^{th}$ frame of image (S218), and starts exposure of the $(n+1)^{th}$ frame of image (S219). Subsequently, after the image sensor 24 has finished reading the $n^{th}$ frame of image (S220), the exposure condition determining section 32 determines exposure conditions [the aperture ratio $F_{(n+2)}$ of the aperture, a shutter speed $Vf_{(n+2)}$, and a gain $G_{(n+2)}$] for the $(n+2)^{th}$ frame on the basis of the $n^{th}$ frame of image data until completion of an exposure period $T_{E(n+1)}$ of the $(n+1)^{th}$ frame. In addition, the lens control section 36 acquires a focus result output from the focus sensor 22, and determines, from the focus result before completion of the exposure period $T_{E(n+1)}$, the amount of movement of the lens $M_{(n+1)}$ of the $(n+1)^{th}$ frame of the focus lens required for focusing (S224).

At this time, the lens control section 36 determines whether or not the focus lens can be moved before start of exposure of the $(n+2)^{th}$ frame (S224). More specifically, given that the frame period of the image sensor 24 is $T_F$, the exposure period of the $(n+2)^{th}$ frame is $T_{E(n+2)}$, and a lens movement period required to move the focus lens over a distance corresponding to the amount of movement of the lens M(n+1) for the $(n+1)^{th}$ frame is $T_{M(n+1)}$, the lens control section 36 determines that the focus lens can be moved when the following equation (1) is fulfilled.

$$T_{M(n+1)} \leq T_F - T_{E(n+2)} \quad (1)$$

When the determination rendered in step (S224) shows that the lens of the focus lens cannot be moved before start of exposure of the $(n+2)^{th}$ frame (the result of the determination rendered in S224 is negative: N), the exposure condition determining section 32 determines exposure conditions for the $(n+2)^{th}$ frame in consideration of the lens movement period $T_{M(n+1)}$ (S226). More specifically, the exposure condition determining section 32 adjusts the exposure period $T_{E(n+2)}$ in such a way that the lens movement period $T_{M(n+1)}$ fulfills Equation (1). In short, the shutter speed $Vf_{(n+2)}$ included in the exposure conditions determined in step (S226) is changed to a shutter speed $V_{S(n+2)}$, which is faster than the shutter speed $Vf_{(n+2)}$, such that the lens movement period $T_{M(n+1)}$ fulfills Equation (1). Moreover, the exposure condition determining section 32 increases a gain used for enhancing sensitivity (hereinafter called a "sensitivity enhancement gain"), in order to compensate for a reduction in the exposure period.

However, when the shutter speed $V_{S(n+2)}$ changed such that the lens movement period $T_{M(n+1)}$ fulfills Equation (1) is too fast, the reduction in exposure period cannot be compensated for even when the sensitivity enhancement gain is increased. There may also arise a case where the image sensor 24 cannot output image data of appropriate exposure.

When the exposure condition determining section 32 has determined the shutter speed $V_{S(n+2)}$, a determination is made as to whether or not the shutter speed $V_{S(n+2)}$ is faster than $Vf_{(n+2)}/2$ (S228). When the shutter speed $V_{S(n+2)}$ is determined to be faster than $Vf_{(n+2)}/2$ as a result of determination (the result of the determination rendered in S228 is affirmative: Y), the exposure condition determining section 32 determines that the image data of appropriate exposure is not obtained at the shutter speed $V_{S(n+2)}$, and the shutter speed is determined to be $Vf_{(n+2)}/2$ (S230). When the shutter speed $V_{S(n+2)}$ is $Vf_{(n+2)}/2$ or less (the result of the determination rendered in S228 is negative: N), the exposure condition determination section 32 determines that image data of appropriate exposure can be obtained at the shutter speed $V_{S(n+2)}$, and determines the shutter speed to $V_{S(n+2)}$ (S232).

In the present embodiment, a determination is made as to whether or not the shutter speed $V_{S(n+2)}$ is used as the exposure conditions, on the basis of whether or not the shutter speed $V_{S(n+2)}$ is faster than $Vf_{(n+2)}/2$. However, the speed, which becomes a criterion of determination, is not limited to $Vf_{(n+2)}/2$. For example, a limit shutter speed and a limit gain, at which appropriate exposure is attained, may be computed while the gain is being changed, and the limit shutter speed may be determined.

Subsequently, the lens control section 36 determines the amount of movement of a lens (S234). When the shutter speed is determined to be $V_{S(n+2)}$, the lens control section 36 determines the amount of movement of the lens determined in step (S222). Meanwhile, when the shutter speed has been determined to be $Vf_{(n+2)}/2$, the lens control section 36 again determines the amount of movement of the lens which can be implemented during a period $[T_F - T_{E(n+2)}]$ before the start of exposure of the $(n+2)^{th}$ frame, thereby determining the thus-determined amount of movement of the lens.

So long as the all-the-way-down depression of the shutter button is detected when exposure of the $(n+1)^{th}$ frame performed during an exposure period $T_{E(n+1)}$ is completed (S236) (the result of the determination rendered in S238 is affirmative: Y), image capture processing is completed. In the meantime, when the all-the-way-down depression of the shutter button has not been detected (the result of the determination rendered in S238 is negative: N), the lens control section 36 outputs to the lens drive mechanism 14 the lens control signal which is based on the determined amount of movement of the lens, thereby effecting AF adjustment (S240). When the shutter button is in the halfway-down-depressed state, image capture processing is further continued (S242).

In the above first modification, the camera 1 sequentially performs AF adjustment on a per-frame basis. Consequently, the image quality of the image data recorded in the ring buffer 42 can be further enhanced as compared with the case where AF adjustment is performed at predetermined frame intervals.

Since the interval at which focus information is acquired is short, there is a high probability that the amount of offset of focus from that achieved for the previous frame being small. Processing is completed within a predetermined period of time if the amount of movement of the lens is small. Hence, an accurate focus state can be maintained.

Next, a second modification of the present embodiment will now be described. In the second modification, after the shutter button has been released from the halfway-down-depressed state, the camera 1 set in the consecutive image capture mode maintains, for a predetermined standby period, the current aperture ratio of the aperture 16 and the positions of the group of lenses constituting the image capture optical system 12.

In the above embodiment and the first modification, when the shutter button is released from the halfway-down-depressed state, the camera 1 immediately opens the aperture 16. Subsequently, when again detecting halfway-down-depression of the shutter button, the camera 1 again adjusts the aperture ratio of the aperture 16 and the positions of the group of lenses. However, there is a case where the user temporarily releases his/her finger from the shutter button and again depresses the shutter button halfway down. In such a case, a certain amount of time is consumed by adjustment of the aperture ratio of the aperture 16 and the positions of the group of lenses. Hence, a certain amount of time is consumed before the camera 1 starts capturing an image of a subject. Consequently, there is a case where the camera 1 cannot capture an image at the user's intended timing.

Therefore, in the second modification, after the shutter button has been released from the halfway-down-depressed state, the camera 1 set in the consecutive image capture mode maintains, for a predetermined standby period, the current aperture ratio of the aperture and the positions of the group of lenses.

Figure 14:
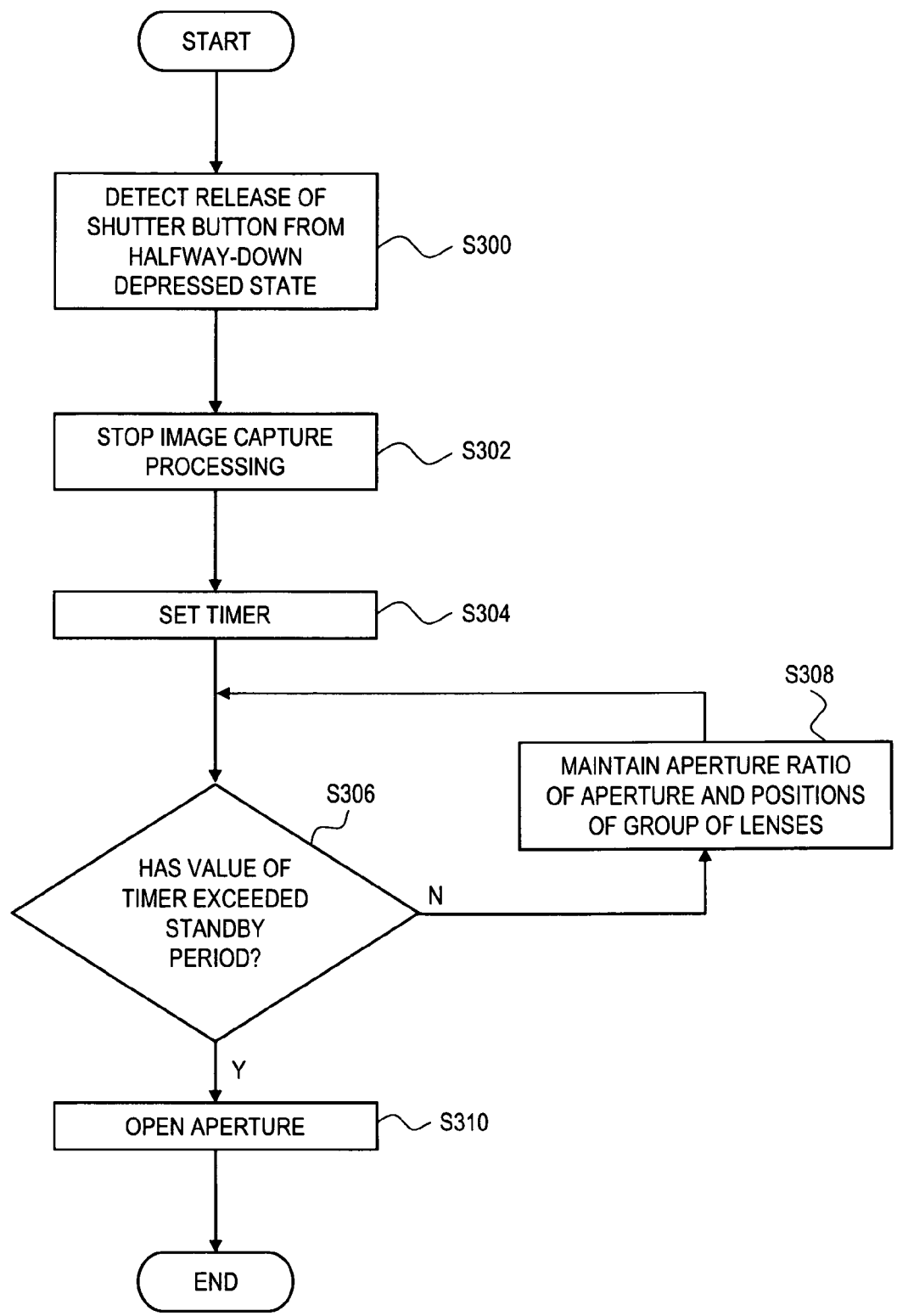
FIG. 14 is a flowchart showing processing procedures employed when a digital camera of a second modification has detected release of a shutter button from a halfway pressed state.

FIG. 14 is a flowchart showing processing procedures employed when the camera 1 has detected release of the shutter button from the halfway-down-depressed state.

Upon detection of release of the shutter button from the halfway-down-depressed state (S300), the camera 1 stops image capture processing (S302). Specifically, the camera 1 stops writing of image data into the ring buffer 42. Subsequently, the camera 1 sets a timer (S304), and remains in a standby condition until the shutter button is again depressed halfway down. During the period of a wait, the camera 1 maintains the aperture ratio of the aperture 16 and the positions of the group of lenses, which are achieved immediately before release of the shutter button from the halfway-down-depressed state, thereby monitoring the timer. The camera 1 maintains the aperture ratio of the aperture 16 and the positions of the group of lenses (S308) until the value of the timer exceeds a predetermined standby period (e.g., 3.0 seconds) (the result of the determination rendered in S306 is negative: N). In the meantime, when the value of the timer has exceeded the predetermined standby period (e.g., 3.0 seconds) (the result of the determination rendered in S306 is affirmative: Y), the camera 1 releases the aperture 16 (S310).

According to the second modification, after the shutter button has been released from the halfway-down-depressed state, the camera 1 maintains, for a predetermined standby period, the current aperture ratio of the aperture and the positions of the group of lenses. Thereby, the time required for AE/AF processing can be shortened. Therefore, the camera 1 can capture an image at the user's intended timing without fail. As in the case of the camera 1 of the embodiment or the second modification, the aperture ratio of the aperture maintained by the camera 1 during a standby state is limited to the range where the focus sensor 22 can detect a focus. Therefore, even when the aperture ratio of the aperture 16 achieved immediately before the shutter button is released from the halfway-down-depressed state is maintained, the camera 1 can again effect focusing operation on the basis of the result of focus detection performed by the focus sensor 22 after the shutter button has again been depressed halfway down.

The second modification has described an example where the current aperture ratio of the aperture is maintained when the camera 1 is in a consecutive image capture mode. However, so long as the current aperture ratio of the aperture is equal to or greater than the minimum aperture ratio, the camera 1 can perform focusing action, regardless of the case of the consecutive image capture mode, on the basis of the result of focus detection performed by the focus sensor 22 while the current aperture ratio of the aperture is maintained. Therefore, when the camera 1 set in the normal image capture mode has detected release of the shutter button from the halfway-down-depressed state, a determination is made as to whether or not the current aperture ratio of the aperture is equal to or greater than the minimum aperture ratio. When the determination shows that the aperture ratio of the aperture is determined to be equal to or greater than the minimum aperture ratio, the camera 1 maintains the current aperture ratio of the aperture and the positions of the group of lenses during a predetermined standby period. By means of processing, even when the camera 1 is set in the normal image capture mode, the time required for AE/AF processing can be shortened.

PARTS LIST 1 digital camera
10 image capture section
12 image capture optical system
14 lens drive mechanism
16 aperture (S310)
18 aperture drive mechanism
20 half mirror
22 focus sensor (S12)
24 image sensor (S16)
26 signal processing circuit
27 analog-to-digital converter
30 control section
32 exposure condition determination section (S14)
34 line drawing storage section
36 lens control section
38 aperture control section
40 image processing section
42 ring buffer (S18) (S120)
44 display image processing section
46 storage image processing section
50 display section
60 storage memory (S122) (S214-S216)
70 operation section
100 exit pupil
102 detection target area
102a detection target area
102b detection target area
220 capacitor lens
222 separator lenses
222a separator lenses
222b separator lenses
224 line sensor
224a line sensors
224b line sensors
S10 shutter button
S20 shutter button
S22 storage image data
S100 shutter button
S102 AF processing S104 exposure
S106 aperture ratio
S108 chronological sequence
S110 half-way-down depressed state
S112 depression of shutter button
S114 predetermined number of frames
S116 AF adjustment
S118 stop outputting image data
S200-S206 adjustment of aperture
S208 image capture processing
S210 depression of shutter button
S212 image capture processing
S218 frame of image
S219 frame of image
S220 frame of image
S222 movement of lens
S224 focus lens required for focusing
S224 exposure of the frame
S226 lens movement period
S228 determination of shutter speed
S230 determination of shutter speed
S232 determination of shutter speed
S234 movement of lens
S236 exposure period
S238 determination of exposure period
S240 AF adjustment
S242 image capture processing
S300 shutter button depression state
S302 image capture processing
S304 timer
S306 determination of standby period
S308 group of lenses

What is claimed is:

1. A digital camera which divides light having come from a subject and passed through an aperture into two beams of light; which causes one of the divided beams of light to enter an image sensor to thereby cause the image sensor to capture an image of a subject; and which causes the other one of the beams of light to enter a focus sensor to thereby cause the focus sensor to detect a focus on the basis of the other beam of light, the camera comprising:
an exposure condition determining section for determining exposure conditions, including an aperture ratio of the aperture, under which the image sensor can capture an image at appropriate exposure, in accordance with the quantity of light from the subject, wherein,
when the focus sensor cannot detect a focus on the basis of the other one of the beams of light divided after having passed through the aperture, at the aperture ratio determined by the exposure condition determining section, the exposure condition determining section fixes the aperture ratio of the aperture at a minimum aperture ratio at or above which the focus sensor can detect a focus, to thus determine the exposure conditions.

2. The digital camera according to claim 1, further comprising:
a focus control section for causing the focus sensor to detect a focus while maintaining the aperture at the minimum aperture ratio during the course of the image sensor consecutively outputting image data on the basis of the light from the subject.

3. The digital camera according to claim 2, further comprising:
an image record control section for recording, among a plurality of frames of image data consecutively output by the image sensor until receipt of an image capture instruction, a frame of image data preceding, by a predetermined time lag period, a frame of image data captured at the time of receipt of the image capture instruction, as an image data for storage purpose in storage memory.

4. The digital camera according to claim 2, wherein the focus control section causes the focus sensor to detect a focus every time the image sensor outputs a predetermined number of frames of image data.

5. The digital camera according to claim 2, wherein the focus control section causes the focus sensor to detect a focus every time the image sensor outputs one frame of image data.

6. The digital camera according to claim 5, further comprising:
a focus processing section for performing focus processing in response to a result of focus detection effected by the focus sensor from when the image sensor has completed exposure processing for one frame until the image sensor starts exposure processing for a subsequent one frame.

7. The digital camera according to claim 1, further comprising:
a control section for, upon receipt of an image capture stop instruction, maintaining the aperture at the minimum aperture ratio for a predetermined standby period from receipt of the image capture stop instruction.

8. The digital camera according to claim 7, wherein the control section maintains the aperture at the minimum aperture ratio for the standby period, and maintains current positions of a group of image capture lenses provided in the digital camera.

9. A digital camera which divides light having come from a subject and passed through an aperture into two beams of light; which causes one of the divided beams of light to enter an image sensor to thereby cause the image sensor to capture an image of a subject; and which causes the other one of the beams of light to enter a focus sensor to thereby cause the focus sensor to detect a focus on the basis of the other beam of light, the camera comprising:
an exposure condition determining section for determining exposure conditions, including an aperture ratio of the aperture, under which the image sensor can capture an image at appropriate exposure, in accordance with the quantity of light from the subject, wherein,
the digital camera can operate in at least a normal image capture mode where the image sensor outputs one frame of image data upon receipt of the image capture instruction and a consecutive image capture mode where the image sensor consecutively outputs image data until receipt of the image capture instruction; and wherein,
when the digital camera operates in the consecutive image capture mode and the focus sensor cannot detect a focus at the aperture ratio determined by the exposure condition determining section, on the basis of the other beam of light divided after having passed through the aperture, the exposure condition determining section fixes the aperture ratio of the aperture at a minimum aperture ratio at or above which the focus sensor can detect a focus, to thus determine the exposure conditions.

10. An exposure condition determining method for determining exposure conditions, including an aperture ratio of the aperture, under which an image sensor can capture an image at appropriate exposure, in accordance with the quantity of light from a subject, in relation to a digital camera which divides light having come from a subject and passed through an aperture, into two beams of light; which causes one of the divided beams of light to enter an image sensor to thereby cause the image sensor to capture an image of a subject; and which causes the other one of the beams of light to enter a focus sensor to thereby cause the focus sensor to detect a focus on the basis of the other beam of light, wherein, when the focus sensor cannot detect a focus on the basis of the other one of the beams of light divided after having passed through the aperture, at the determined aperture ratio, the aperture ratio of the aperture is fixed at a minimum aperture ratio at or above which the focus sensor can detect a focus, to thus determine the exposure conditions.

11. An exposure condition determining method for determining exposure conditions, including an aperture ratio of the aperture, under which an image sensor can capture an image at appropriate exposure, in accordance with the quantity of light from a subject, in relation to a digital camera which divides light having come from a subject and passed through an aperture, into two beams of light; which causes one of the divided beams of light to enter an image sensor to thereby cause the image sensor to capture an image of a subject; and which causes the other one of the beams of light to enter a focus sensor to thereby cause the focus sensor to detect a focus on the basis of the other beam of light, wherein, the digital camera can operate in at least a normal image capture mode where the image sensor outputs one frame of image data upon receipt of the image capture instruction and a consecutive image capture mode where the image sensor consecutively outputs image data until receipt of the image capture instruction; and wherein, when the digital camera operates in the consecutive image capture mode and the focus sensor cannot detect a focus at the aperture ratio determined by the exposure condition determining section, on the basis of the other beam of light divided after having passed through the aperture, the exposure condition determining section fixes the aperture ratio of the aperture at a minimum aperture ratio at or above which the focus sensor can detect a focus, to thus determine the exposure conditions.

* * * * *